United States Patent [19]

Yamamoto et al.

[11] Patent Number: 5,404,194
[45] Date of Patent: Apr. 4, 1995

[54] COVER WINDING APPARATUS FOR WINDING COVER ATTACHED TO OPENING PART OF CONTAINER

[75] Inventors: Junichi Yamamoto, Hadano; Naoyuki Matsuda, Sagamihara, both of Japan

[73] Assignee: Minolta Co., Ltd., Osaka, Japan

[21] Appl. No.: 228,454

[22] Filed: Apr. 15, 1994

Related U.S. Application Data

[63] Continuation of Ser. No. 916,345, Jul. 17, 1992, abandoned.

[30] Foreign Application Priority Data

Jul. 22, 1991 [JP] Japan ................. 3-181082

[51] Int. Cl.⁶ ............................................. G03B 27/58
[52] U.S. Cl. ..................... 355/72; 271/145; 354/276
[58] Field of Search .......... 355/72, 308, 311; 354/275, 276, 277; 271/145; 206/455, 467, 578

[56] References Cited

U.S. PATENT DOCUMENTS

| | | | |
|---|---|---|---|
| 4,621,272 | 11/1986 | Toriumi et al. | 346/134 |
| 4,727,391 | 2/1988 | Tajima et al. | 354/277 |
| 4,783,019 | 11/1988 | Schmidt et al. | 242/74 |
| 4,799,591 | 1/1989 | Tajima et al. | 206/455 |
| 4,876,706 | 10/1989 | Tajima | 354/277 X |
| 5,051,775 | 9/1991 | Yamakoshi et al. | 355/72 |
| 5,149,078 | 9/1992 | Matsuda et al. | 271/145 |
| 5,169,137 | 12/1992 | Matsuda et al. | 271/145 |

FOREIGN PATENT DOCUMENTS

57-38669  8/1982  Japan .
1556816  9/1976  United Kingdom .

Primary Examiner—Fred L. Braun
Attorney, Agent, or Firm—Price, Gess & Ubell

[57] ABSTRACT

A cover winding apparatus can wind and rewind a cover that is detachably attached to an opening of a container. A control apparatus is provided so that the roller member can be assured to stop at a different position on each winding cycle. A plurality of detecting sensors can define a stop position for the roller member and alternatively the control apparatus can be utilized to generate a different pulse number that can be applied to a stepper motor with a variable pulse number used for each operation of a winding cycle.

29 Claims, 8 Drawing Sheets

COVER WINDING APPARATUS FOR WINDING COVER ATTACHED TO OPENING PART OF CONTAINER

This is a continuation of application Ser. No. 07/916,345, filed on Jul. 17, 1992, now abandoned.

BACKGROUND OF THE INVENTION

1. Field of the Invention

This invention relates to a cover winding apparatus for opening and closing an opening part of a container by winding to a prescribed position and rewinding to the home position a cover member attached to the opening of the container such as, for example, a magazine cover attached to the opening part of a magazine used in an image forming system. It particularly relates to a cover winding apparatus so configured that the cover member will not form a wrinkle when it is rewound.

2. Description of the Prior Art

In a laser printer, for example, a magazine is used as a container for a recording medium. This magazine contains a photosensitive sheet film as the recording medium. Since the photosensitive agent applied to the film must be kept from exposure to light until the magazine is set in place in the laser printer, a magazine cover for closing the opening part of the magazine is attached to this opening part to shield the interior of the magazine from the ambient light. The magazine cover is detachably attached to the edge of the opening part as with a double-faced adhesive tape. The opening part is opened when the magazine cover is peeled. The opening part is closed to shield the film from the ambient light when the magazine cover is attached again.

U.S. patent application Ser. No. 07/634,702, filed Dec. 27, 1990, now U.S. Pat. No. 5,149,078, disclosed a cover winding apparatus which is configured so as to open and close the opening part of a magazine by winding the magazine cover to a prescribed position and rewinding it to the home position. This cover winding apparatus is provided with a winding roller which is adapted to produce a sliding motion along the upper surface of the magazine and generate a rotation of itself in consequence of the sliding motion so that the magazine cover is wound round the winding roller to open the opening part then the winding roller is rotated to produce the sliding motion in one direction, whereas the magazine cover is rewound from the winding roller to close the opening part when the winding roller is rotated to produce the sliding motion in the opposite direction.

In the conventional cover winding apparatus of this class, after the action of winding the magazine cover and the action of reminding it are repeated a plurality of times, the possibility arises that the magazine cover will draw a wrinkle "floating" at the stop position at which the winding roller completes the action of winding, namely the stop position at which the magazine cover is wound to the prescribed position to open the opening part completely.

Figure 10:
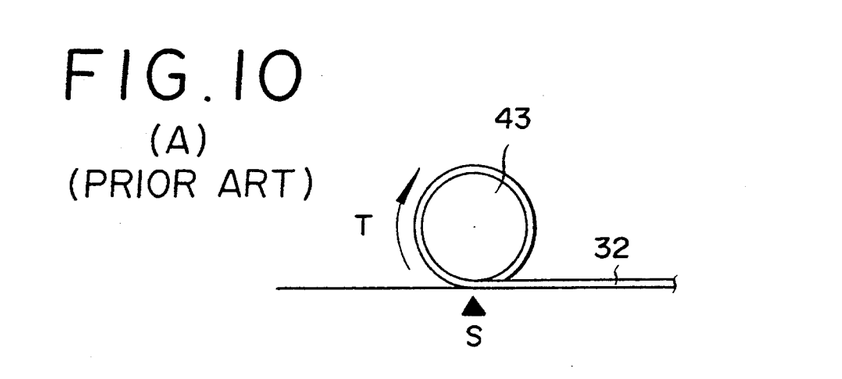

This inconvenience is depicted in FIG. 10. FIG. 10 (A) illustrates the state of a winding roller 43 which has assumed the stop position in consequence of completion of the action of winding a magazine cover 32. While the winding roller 43 is in the process of winding the magazine cover 32, the possibility of the cover 32 forming a wrinkle is precluded by carrying out the action of this winding while continuing exertion of tension as indicated by a broken line upon the magazine cover 32. As a result, the exertion of the tension upon the magazine cover 32 persists even after the action of winding has been perfected. Further, in the conventional cover winding apparatus, the stop position at which the winding roller 43 assumes after completion of the action of winding is fixed, depending on the particular kind of magazine.

The tension exerted upon the cover 32 suddenly decreases when the action of rewinding the magazine cover 32 is started as illustrated in FIG. 10 (B) from the state mentioned above. When the action of winding the magazine cover 32 and the action of rewinding it are repeated, the possibility of the cover 32 drawing a wrinkle L near the stop position S assumed by the winding roller 43 on completing the winding action because the tension suddenly decreases at the start of the action of rewinding and further because the stop position S at which the winding roller 43 completes the winding action is fixed. The ease with which the wrinkle L occurs increases when the magazine cover 32 is made of a material susceptible of elongation. The occurrence of the wrinkle L of this nature in the magazine cover 32 entails the disadvantage that the ability of the magazine to shield the film contained therein from the ambient light is affected adversely by this wrinkle L.

SUMMARY OF THE INVENTION

The present inventors, after continuing a diligent study for the solution of the problem mentioned above, have found that the magazine cover 32 is prevented from forming a wrinkle near the stop position to be assumed by the winding roller 43 on completion of the winding action when the stop position of the winding roller 43 is allowed to vary after each round of the action of winding the magazine cover 32. They have further found that when a load is exerted upon the rotation of the winding roller 43 during the action of winding, the cover 32 is prevented from forming a wrinkle near the stop position assumed on completion of the action of winding and the cover 32 can be rewound without being slackened.

An object of this invention is to provide a cover winding apparatus which is capable of closing tightly a container by causing a cover member to close an opening part of the container without suffering the cover member to form a wrinkle even after the action of winding the cover member and the action of rewinding it have been repeated.

In accordance with the first aspect of this invention, even after the action of winding the cover member and the action of rewinding it have been repeated, the cover member on being rewound to close the opening part is prevented from forming a wrinkle because the stop position assumed by the winding member after completion of the action of winding is varied after each round of the action of winding the cover member by the use of means for varying the stop position. As a result, the tightness of closure of the container can be maintained.

In accordance with the second aspect of this invention, while the cover member is in the process of being rewound, it is drawn and rewound without slackening the opening part because the load is exerted on the rotation of the winding member by the load imparting means. Even after the action of winding the cover member and the action of rewinding it have been repeated, therefore, the cover member on closing the opening part avoids forming a wrinkle and enables the container to retain tightness of closure consequently.

BRIEF DESCRIPTION OF THE DRAWINGS

FIG. 6 (A), 6 (B), and 6 (C) are diagrams depicting the state in which the stop position to be assumed by a winding roller after completion of the action of winding is varied by the means for varying the stop position;

FIG. 9 (A) and (B) are diagrams intended to aid in explanation of the action of the load imparting means;

FIG. 10 (A) and (B) are diagrams depicting the inconvenience encountered by the conventional apparatus.

DESCRIPTION OF THE PREFERRED EMBODIMENTS

Now, a laser printer which incorporates a cover winding apparatus of this invention therein will be described below.

Figure 1:
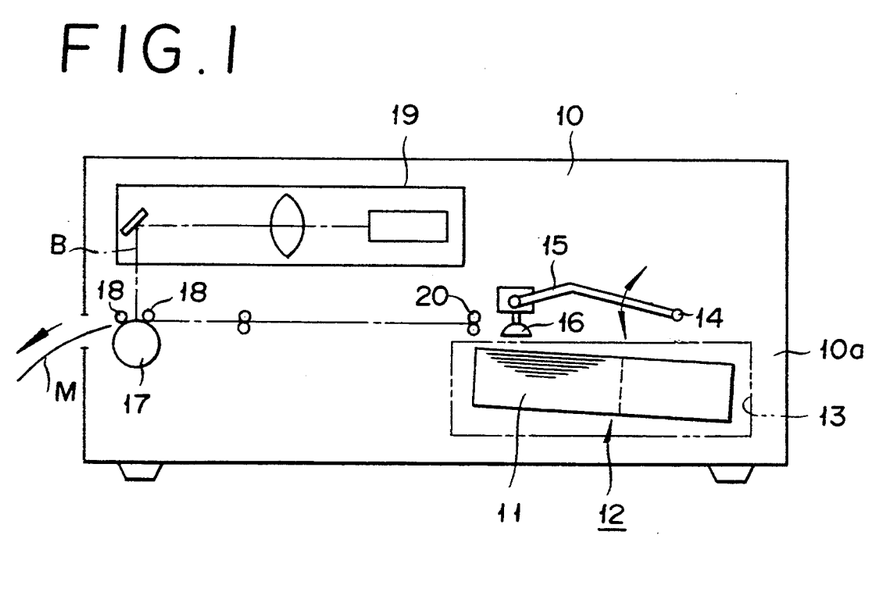
FIG. 1 is a front view illustrating schematically the inner construction of a laser printer.

FIG. 1 is a front view illustrating schematically the inner construction of the laser printer. Inside the main body 10 of the laser printer, a magazine or container 11 containing a recording medium M in the form of separate sheets is detachably retained on a magazine retaining device 12. This magazine retaining device 12 is adapted to be drawn out toward the front part side of the main body 10 of apparatus via a loading mouth 13 formed in a front wall 10a of the main body 10 of the apparatus.

To allow separate extraction of each of the sheets of the medium M stored inside the magazine 11, a paper feeding arm 15 is attached to a supporting shaft 14 so as to be freely swung round the supporting shaft 14 as the center. This paper feeding arm 15 is provided at the leading terminal thereof with a vacuum cup 16 adapted to attract by vacuum the uppermost of the piled sheets of the medium M. After the paper feeding arm 15 has been swung to the position at which the vacuum cup 16 contacts the medium M and the vacuum cup 16 has attracted by suction the uppermost of the piled sheets of medium M, the subsequent return of the leading terminal of the paper feeding arm 15 to the position of uppermost reach allows the leading terminal of the medium M to rise to the prescribed position. At this particular position, a pair of conveying rollers 20 for conveying the raised medium M are provided. By these conveying rollers 20, the medium M is transported in the direction of the interface between an image producing drum 17 and two conveying rollers 18 pressed against the image producing drum 17.

On the photosensitive surface of the medium M, a laser beam B from an optical unit 19 disposed inside the main body 10 of the apparatus is projected between the two conveying rollers 18 to write an image on the medium M. The medium M on which the image has been written is conveyed to a developing device (not shown), wherein the image is developed.

Figure 2:
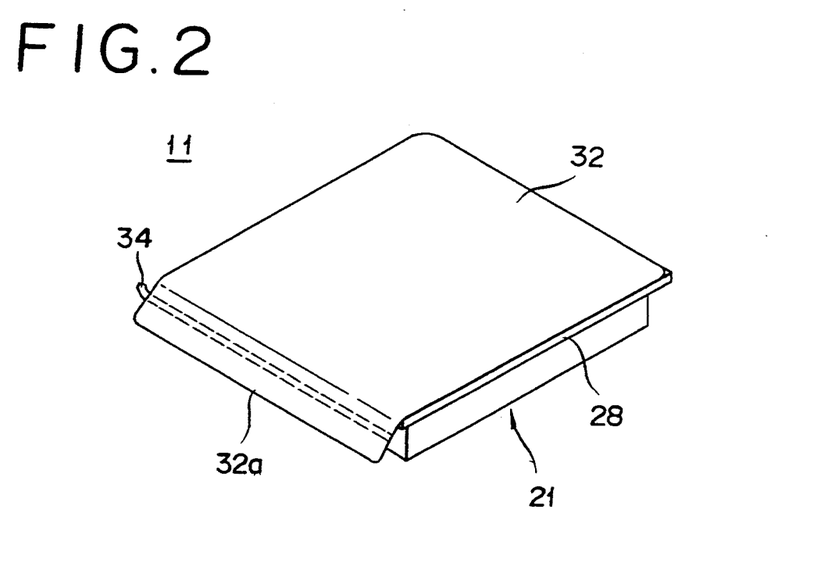
FIG. 2 is a perspective view illustrating the outward appearance of a magazine.
Figure 3:
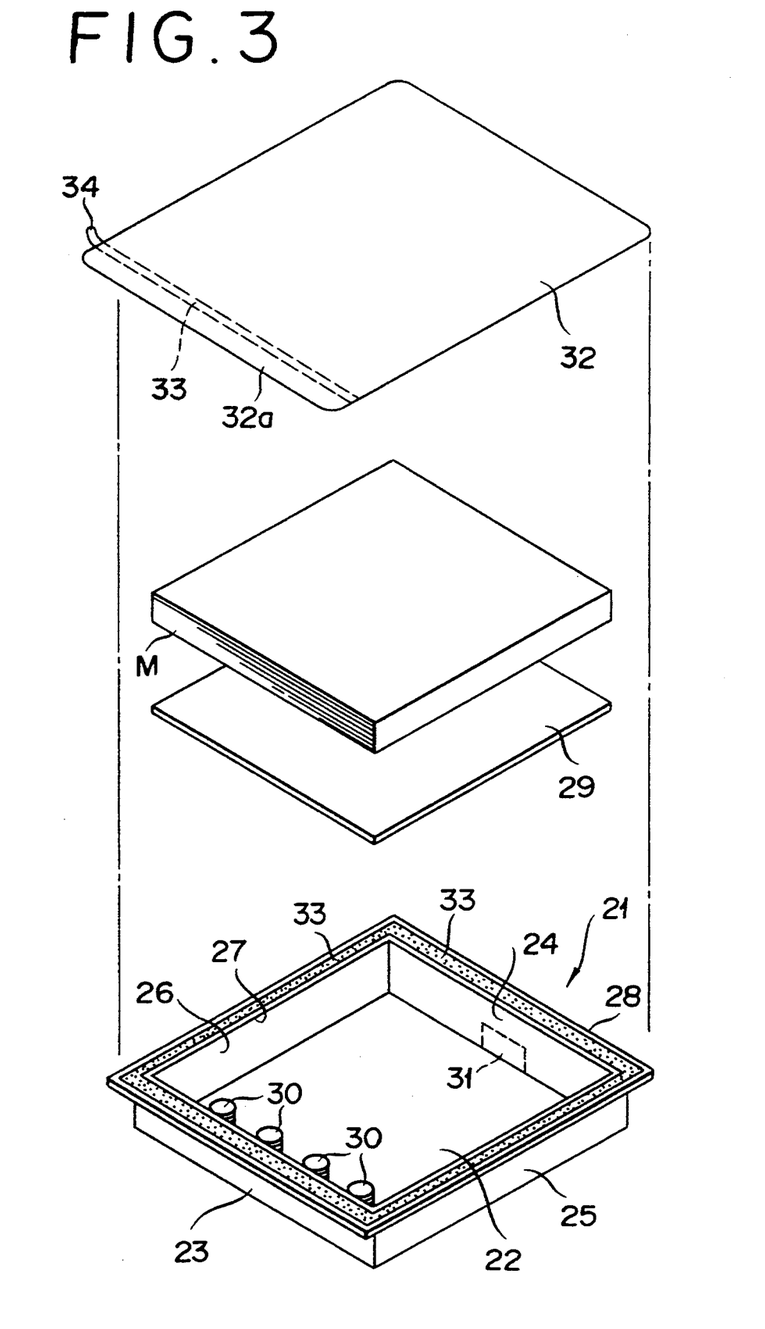
FIG. 3 is an exploded perspective view of the magazine shown in FIG. 2.

FIG. 2 is a perspective view illustrating the outward appearance of the magazine 11 and FIG. 3 is an exploded perspective view of this magazine 11.

As illustrated in FIG. 3, the magazine 11 is provided with a main body part 21 of the magazine formed in a one-piece construction with a lightproof plastic substance. This main body 21 of the magazine has the shape of a blind box consisting of a bottom plate 22, a front side wall 23, a rear side wall 24, a right side wall 25, and a left side wall 26 and is provided on the upper terminal side thereof with an opening part 27. The opening part 27 has an outwardly flaring edge part 28. Inside the main body 21 of the magazine, a cardboard 29 is set in place and used for allowing sheets of the medium M to be mounted in a piled state thereon. On the part of the bottom plate 22 near the front side wall 23, a plurality, four for example, of lightproof expandable bellows 30 are disposed. Through holes (not shown) communicating with the interiors of the bellows 30 are formed in the bottom plate 22. The laser printer is provided with a lifting device (not shown) adapted to fix the height of the medium M. Operating rods (not shown) for this lifting device are adapted to pierce the through holes and settle inside the bellows 30. When the operating rods are extended upwardly and the bellows 30 are consequently stretched, the front side of the cardboard 29 is pushed up and the front terminal side height of the medium M is maintained at a fixed level. To the rear side wall 24 of the main body 21 of the magazine, a bar-code 31 for discrimination of kind and size of the medium M stored inside the magazine 11 is fastened.

The medium M to be used in the laser printer consists of photosensitive sheets of film. Until the magazine 11 is set in place inside the main body 10 of the laser printer, it must be handled so that the photosensitive agent applied to the film may not be exposed to the ambient light. For this reason, to the opening part 27 of the magazine 11, a magazine cover 32 for opening and closing the opening part 27 is attached as illustrated in FIG. 2. This cover 32 enables the magazine 11 to maintain a lightproof condition. The magazine cover 32 is made of a lightproof vinyl sheet, for example, and is detachably attached to the edge 28 of the magazine 11 through the medium of an adhesive member. A double-faced adhesive tape 33 is one example of this adhesive member. The adhesive force of this double-faced adhesive tape 33 is so set that the adhesive force produced between the edge 28 and the double-faced adhesive tape 33 is greater in any case than that produced between the double-faced adhesive tape 33 and the magazine cover 32. After the magazine cover 32 has been peeled off, therefore, the double-faced adhesive tape 33 will remain on the magazine 11 side. The opening part 27 is opened when the magazine cover 32 is peeled. When the magazine cover 32 is attached again, the opening part 27 is closed to shield the medium M from the ambient light. The adhesive member need not be limited to the double-faced adhesive tape 33. A coating of adhesive agent applied to the upper surface of the edge 28 may be used instead.

On the front side of the magazine cover 32, a leader part 32a extended to a length of about 30 to 40 mm past the edge 28 of the main body 21 of magazine is formed. To this leader part 32a, the adhesive member such as the double-faced adhesive tape 33 is attached parallelly to the front side wall 23 of the main body 21 of magazine. A peel paper 34 is attached to the part of the double-faced adhesive tape 33 falling in this region. This peel paper 34 is peeled when the leader part 32a is fixed to a winding roller 43 which will be more specifically described hereinafter so that the double-faced adhesive tape 33 may fasten the reader part 32a to the winding roller 43.

Figure 4:
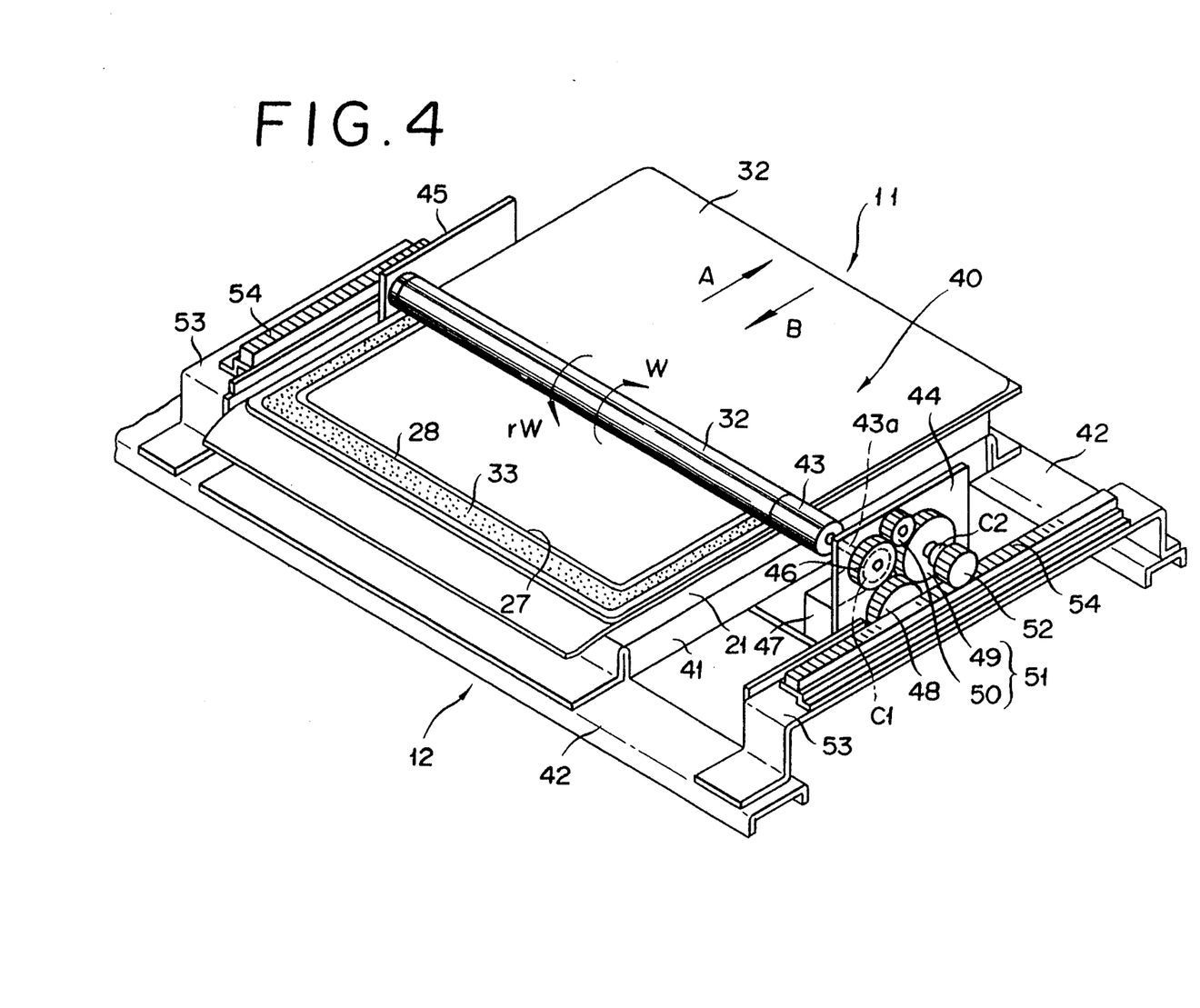
FIG. 4 is a perspective view illustrating in detail a magazine retaining device shown in FIG. 1, particularly the state assumed by a magazine cover after it has been wound to a prescribed position by a cover winding apparatus which is provided for the magazine retaining device.

The magazine retaining device 12 holding the magazine 11 in position is illustrated in detail in FIG. 4. Particularly, in this diagram, the state in which the magazine cover 32 has been wound to a prescribed position by a cover winding apparatus 40 provided for the magazine retaining device 12 is illustrated. The following explanation will be made on the assumption that the lefthand front side forms the front side of a pertinent member, the righthand recessed side the rear side forms, the righthand front side forms the right front side, and the lefthand recessed side the left side respectively in the bearings of the diagram.

The magazine retaining device 12 is adapted to be drawn out toward the front side of the main body 10 of the printer by means of a sliding mechanism (not shown). A magazine case 41 for detachably retaining the magazine 11 is set in place on front and rear base plates 42. When the magazine retaining device 12 is drawn out toward the front side of the main body 10 of the printer, the magazine 11 is set in place in a magazine case 41 or it is removed out of the magazine case 41. The magazine retaining device 12 is further provided with a cover winding device 40 for winding or rewinding the magazine cover 32 of the magazine 11 which is set in place therein. After the magazine retaining device 12 has been set in place inside the main body 10 of the printer, the opening part 27 is opened when the cover winding device 40 winds the magazine cover 32 and the opening part 27 is closed when the cover winding device 40 rewinds the magazine cover 32.

The cover winding device 40 is provided with a winding roller or winding member 43 adapted to move astraddle the magazine case 41 along the upper surface of the magazine cover 32. The opposite terminals of a supporting shaft 43a of the winding roller 43 are rotatably supported on roller retaining plates 44, 45 positioned at the lateral opposite sides of the magazine case 41. Driven gears 46 are attached one each through the medium of an electromagnetic clutch C1 to the opposite terminals of a supporting shaft 43a which runs through the roller retaining plates 44, 45. A winding motor 47 is attached to the roller retaining plate 44 on the right side and a drive gear 48 to be driven by this motor 47 is rotatably supported on the roller retaining plate 44. For the purpose of transmitting the rotating force of the motor 47 to the winding roller 43, an intermediate gear train 51 provided with a first gear 49 and a second gear 50 is interposed between the drive gear 48 and the driven gear 46. These first and second gears 49, 50 are rotatably supported on the roller retaining plate 44. A pinion 52 is coaxially attached to the first gear 49 through the medium of an electromagnetic clutch C2. A rack supporting stand 53 parallel to the right side of the magazine case 41 is set in place on the front and rear base plates 42 and a rack 54 to be meshed with the pinion 52 is attached to the upper surface of the rack supporting stand 53. Similarly on the left side of the magazine case 41, a rack supporting stand 53 having a rack 54 attached thereto is installed. On the roller retaining plate 45 on the left side, an intermediate gear train 51 provided with a first gear 49 and a second gear 50 (not shown) is installed in such a manner as to be meshed with a driven gear 46 which is attached to the left terminal part of the supporting shaft 43a. A pinion 52 to be meshed with the rack 54 is attached to the first gear 49.

The winding roller 43 is rotated in the direction W of winding the magazine rover 32 through the medium of the intermediate gear train 51 when the drive gear 48 is driven by the winding motor 47 and rotated counterclockwise in the bearings of the diagram and, at the same time, the electromagnetic clutch C2 is turned on with the electromagnetic clutch C2 turned off. In response to this winding action, the roller retaining plates 44, 45 are moved along the direction A from the front side to the rear side of the magazine 11. Conversely, when the drive gear 48 is rotated clockwise in the bearings of the diagram and, at the same time, the electromagnetic clutch C2 is turned on with the electromagnetic clutch C1 turned off, the pinion 52 rotating counterclockwise is meshed with the rack 54 and, as a result, the roller retaining plates 44, 45 are moved along the direction B from the rear side to the front side of the magazine 11. In consequence of this motion, the winding roller 43 is rotated in the direction rW of rewinding the magazine cover 32.

When the drive gear 48 is driven by the winding motor 47 and rebated counterclockwise in the bearings of the diagram, the winding roller 43 is rotated in the direction of winding and caused to produce a sliding motion along the direction A in the diagram on the upper surface of the magazine cover 32. As a result, the magazine cover 32 peeled from the double-faced adhesive tape 33 and simultaneously wound on the winding roller 43 to open the opening part 27 of the magazine 11. When the drive is rotated clockwise in the bearings of the diagram, the winding roller 43 is rotated in the direction rW of rewinding and simultaneously caused to produce a sliding motion along the direction B in the diagram on the upper surface of the magazine cover 32. As a result, the magazine cover 32 is unwound from the winding roller 43 and attached to the double-faced adhesive tape 33 to close the opening part 27.

For the detection of the initial positions of the roller retaining plates 44, 45, or the positions which the roller retaining plates 44, 45 assume before winding the magazine cover 32, an initial position detecting sensor (not shown) which is formed of a microswitch, for example, is attached to the base plate 42 of the magazine retaining device 12.

The cover winding device 40 is further provided with stop position varying means 60 which enables the stop position to be assumed by the winding roller 43 on completion of the winding action, namely the stop position assumed by the winding roller 43 after winding the magazine cover 32 to a prescribed length and consequently opening the opening part 27, to be varied along the longitudinal direction of the cover 32 for each round of the action of winding the magazine cover 32.

Figure 5:
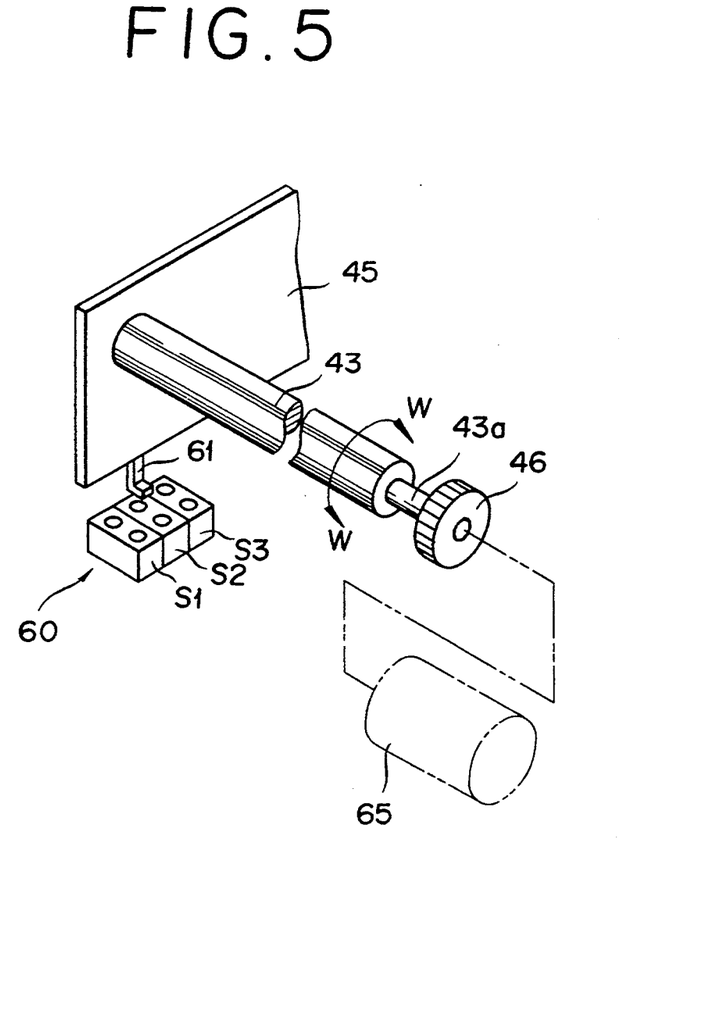
FIG. 5 is a perspective view depicting means for varying the stop position and means for exerting a load.

One example of the stop position varying means 60 is depicted in FIG. 5. The stop position varying means 60 is provided with first to third stop position detecting sensors S1, S2, and S3 each formed of a photosensor.

These sensors S1 to S3 are disposed as arranged along the longitudinal direction of the magazine case 41, with the second sensor S2 at the center serving as the position for design basis. Since the magazine 11 is not limited to one type, the design basis mentioned above does not mean the basis for the apparatus as a whole but means the basis for each type of the magazine 11. The distance between the first sensor S1 and the second sensor S2 and the distance between the second sensor S2 and the third sensor S3 are set at about 5 mm, for example. This distance is selected on the sole condition that it should produce absolutely no hindrance to the action of paper feeding. It may be 4 mm or 8 mm as occasion demands.

As illustrated in the diagram, an actuator 61 adapted to intercept the light from the sensors S1 to S3 is attached to the roller retaining plate 45. This actuator 61 is positioned below the winding roller 43 and is allowed to intercept successively the beams of light from the sensors S1 to S3 in consequence of the motion of the roller retaining plates 44, 45. The sensors S1 to S3 are adapted to be turned on when the beams of light emitted therefrom are severally intercepted. The stop position varying means 60 is connected to control means such as a CPU (not shown). The CPU is adapted to receive signals from the sensors S1 to S3 as inputs and emit control signals to the winding motor 47. When the sensors S1 to S3 are turned on each time the magazine cover 32 is wound, the CPU emits to the winding motor 47 a control signal to stop the operation of that winding motor 47. As a result, the stop position assumed by the winding roller 43 on completion of the winding action can be varied in three steps along the longitudinal direction of the cover 32 each time the magazine cover 32 is wound.

Figure 6:
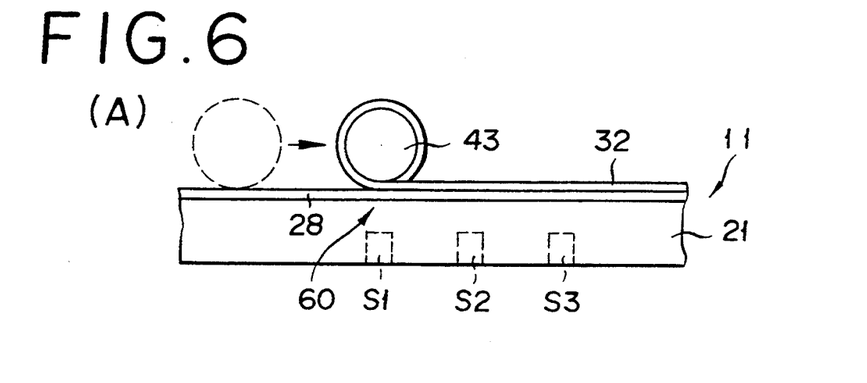

FIG. 6 is a diagram showing the stop position which is variable in three steps. FIG. 6 (B) illustrates the state of the winding roller 43 brought to rest at the second stop position as the position of design basis when the second sensor S2 is turned on, FIG. 6 (A) illustrates the state of the winding roller 43 brought to rest at the first stop position on the front side relative to the position of design basis when the first sensor S1 is turned on, and FIG. 6 (C) illustrates the state of the winding roller 43 brought to rest at the third stop position on the rear side relative to the position of design basis when the third sensor S3 is turned on. The winding motor in the present embodiment is a DC motor.

Figure 7:
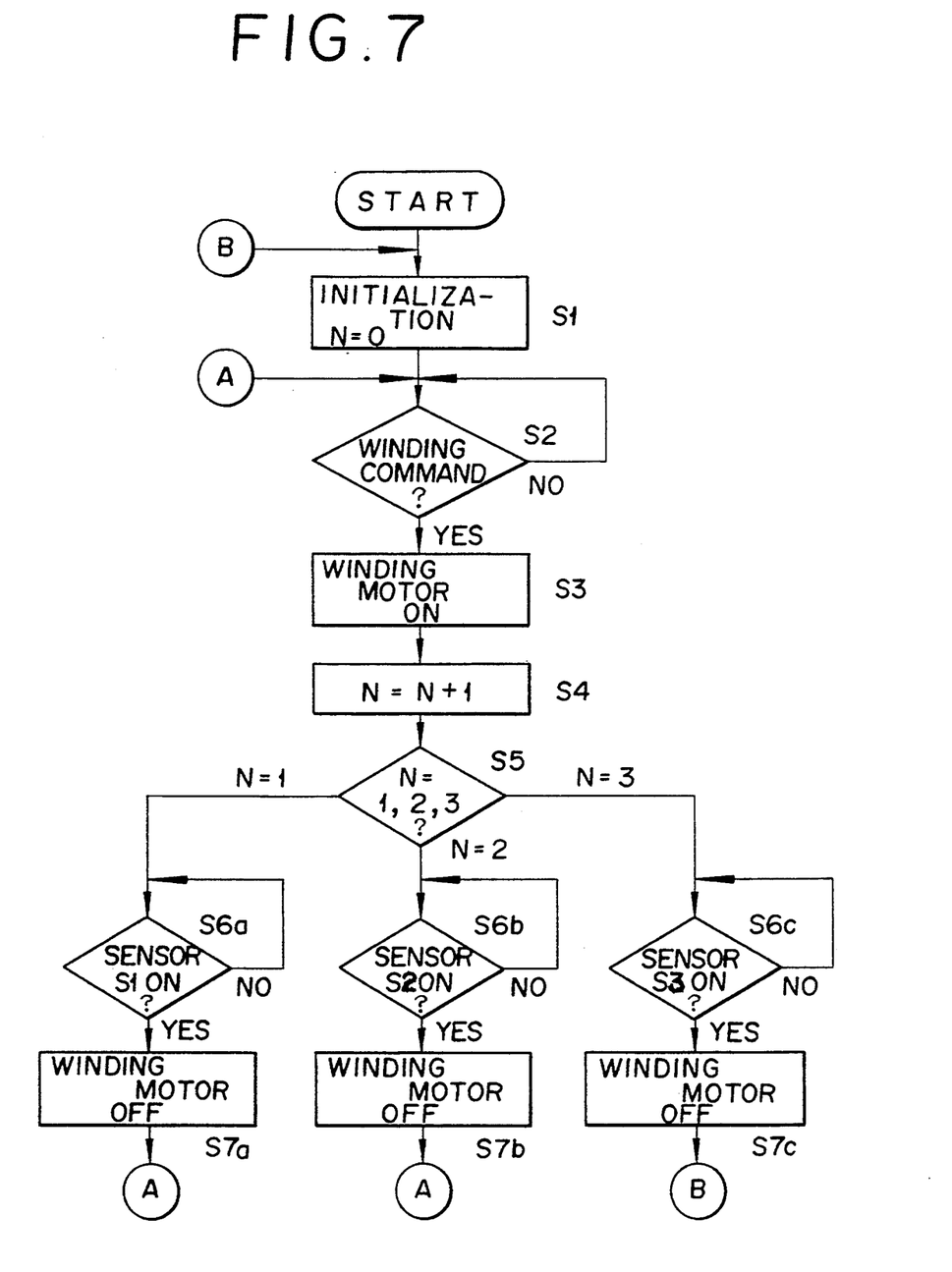
FIG. 7 is a flow chart showing the operation of one example of the means for varying the stop position.

Now, the operation of the embodiment cited above will be described below with reference to the flow chart shown in FIG. 7.

When the magazine 11 is set in place in the main body 10 of printer and a program for driving the cover winding device 40 is started, the variable N indicating the cumulative number of winding actions is initialized (Step S1). When a command to wind the magazine cover 32 is detected at Step S2, the winding motor 47 is turned on and the drive gear 48 shown in FIG. 4 is set rotating counterclockwise (Step S3). In response to the rotation of the drive gear 48, the winding roller 43 is rotated in the direction W of winding and simultaneously caused to produce a sliding motion along the direction A shown in FIG. 4 on the upper surface of the magazine cover 32. As a result, the magazine cover 32 is peeled off the double-faced adhesive tape 33 and simultaneously wound on the winding roller 43 to open the opening part 27 of the magazine 11. Then, "1" is added to the variable N at Step S4 and the numerical value of the variable N is discerned at Step S5.

When the numerical value of this variable N is discerned to be "1" at this Step S5, the processing advances to Step S6a, at which the action of winding the magazine cover 32 is continued until the actuator 61 disposed on the roller retaining plate 45 intercepts the beam of light from the first sensor S1, namely until the first sensor S1 is turned on. When the first sensor S1 is turned on in consequence of the motion of the roller retaining plates 44, 45, the winding motor 47 is turned off at Step S7a and the winding roller 43 is brought to a stop at the first stop position shown in FIG. 6 (A). Then, the processing is returned to Step S2 and kept waiting there until the next command to wind the magazine cover 32 is detected.

When the next command to wind the magazine cover is detected at Step S2, the processing advances in the same manner as described above to Step S5, at which the numerical value of the variable N is discerned to be "2." In this case, the processing advances to Step S6b, at which the action of winding the magazine cover 32 is continued until the second sensor S2 is turned on. When the second sensor S2 is turned on, the winding motor 47 is turned off at Step S7b and the winding roller 43 is brought to a stop at the second stop position shown in FIG. 6 (B). Then, the processing is returned to Step S2 and kept waiting there until the next command to wind the magazine cover is detected.

When the next command is detected at Step S2, the processing advances in the same manner as described above to Step S5, at which the numerical value of the variable N is discerned to be "3." In this case, the processing advances to Step S6c, at which the action of winding the magazine cover 32 is continued until the third sensor S3 is turned on. When the third sensor S3 is turned on, the winding roller 34 is brought to a stop at the third stop position shown in FIG. 6 (C) at Step S7c. Then, the processing is returned to Step S1 and, after the variable N is initialized, kept waiting there until the next command to wind the magazine cover 32 is detected.

The variable N is initialized when the count of actions of winding totals to 3. The winding roller 43, therefore, is destined to make stops by repeating a sequential cycle of first stop position, second stop position (position for design basis) and third stop position.

In the embodiment described above, the stop position which the winding roller 43 assumes on completing the action of winding is allowed to vary to three positions along the longitudinal direction of the cover 32 each time the magazine cover 32 is wound as described above. The possibility that the part of the cover 32 approximating the stop position to be assumed on completion of the action of winding will form a wrinkle when the cover 32 is rewound and applied again to the edge 28 of the opening part 27, therefore, is precluded even when the action of winding the magazine cover 32 and the action of rewinding it are repeated. As a result, the lightproofness of the medium M held inside the magazine 11 can be maintained and the performance of the magazine 11 itself can be consequently improved and the number of open-close cycles of the cover 32 or the frequency of use of the magazine 11 increased.

The stop position varying means 60 needs not be limited to the configuration described above but may be modified in various respects. In one modification, for example, the first stop position detecting sensor S1 may be positioned opposite the first stop position to be assumed by the winding roller 43 after completion of the action of winding and the stops at the second and third stop positions after completion of the action of winding may be controlled by means of a timer, i.e. on the basis of the elapse of time after the time at which the first stop position detecting sensor S1 is turned on. The winding motor 47 in this modification is a stepping motor. The operation of the apparatus is depicted by the flow chart of FIG. 8.

Figure 8:
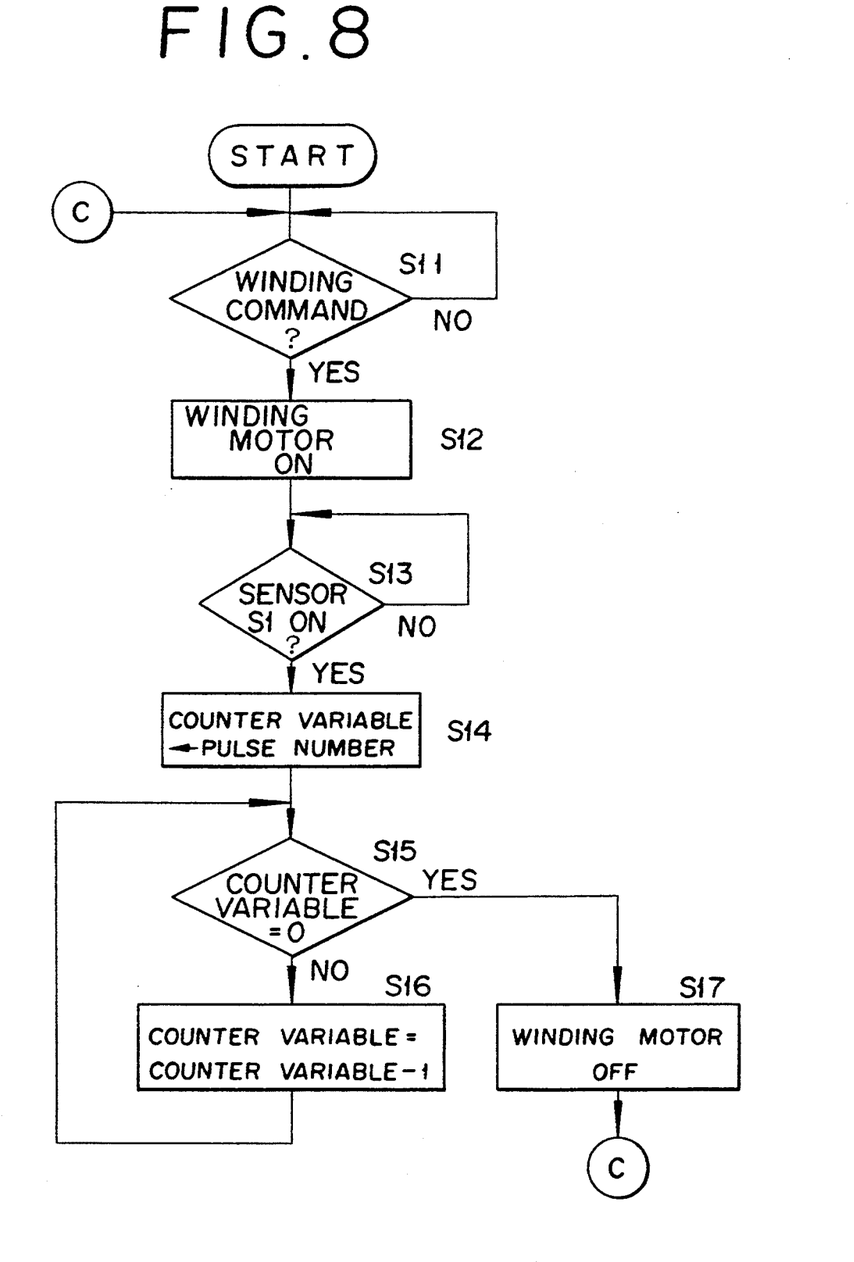
FIG. 8 is a flow chart showing the operation of another example of the means for varying the stop position.

When the program for driving the cover winding device 40 is started and the command to wind the magazine cover 32 is detected at Step S11, the winding motor 47 is turned on and the drive gear 48 shown in FIG. 4 is set rotating counterclockwise (Step S12). As a result, the winding roller 43 rotates in the direction W of winding and simultaneously produces a sliding motion along the direction A shown in the diagram on the upper surface of the magazine cover 32 and the magazine cover 32 is peeled off the double-faced adhesive tape 33 and simultaneously wound on the winding roller 43 to open the opening part 27 of the magazine 11 (Step S13).

When the first sensor S1 is turned on in consequence of the motion of the roller retaining plates 44, 45, a prescribed pulse number P is set for the counter variable (Step S14). As the prescribed pulse numbers P, the pulse number P1 (=0) which is necessary for stopping the winding roller 43 at the first stop position after completion of the winding action, the pulse number P2 which is necessary for moving the winding roller 43 to the second stop position (the position for design basis) after the first sensor S1 is turned on, and the pulse number P3 which is necessary for moving the winding roller 43 to the third stop position after the first sensor S1 is turned on are determined in advance. The setting of the prescribed pulse numbers P for the counter variable is effected so that the winding roller 43 makes stops by repeating the sequential cycle of first, and second and third stop position in this order similarly to the embodiment described above. To be specific, this setting is made so that the pulse number P1 is set for the counter variable in the first, fourth, and seventh actions of winding, the pulse number P2 for the counter variable in the second, fifth, and eighth actions of winding, and the pulse number P3 for the counter variable in the third, sixth, and ninth actions of winding respectively.

When the setting of the prescribed pulse number P for the counter variable is completed, the action of winding the magazine cover 32 is continued until the counter variable turns to "0" at Steps S15 and S16. When the counter variable is turned to "0", the winding motor 47 is turned off and the winding roller 43 is stopped at the stop position corresponding to the pulse number counted thence. Then, the processing is returned to Step S11 and kept waiting there until the next command to wind the magazine cover 32 is detected.

Similarly to the embodiment described above, this embodiment enables the stop position assumed by the winding roller on completion of the action of winding to be varied selectively to three positions along the longitudinal direction of the magazine cover 32 each time the cover 32 is wound. Thus, the possibility that the part of the cover 32 approximating the stop position forms a wrinkle when the cover 32 is rewound and applied again to the edge 28 of the opening 27 is precluded even when the action of winding the magazine cover 32 and the action of rewinding it are repeated. As a result, the lightproofness of the medium M held in the magazine 11 is maintained, the performance of the magazine 11 itself improved, and the frequency of use of the magazine 11 increased.

In the two embodiments with respect to the stop position varying means described above, the winding roller 43 makes stops by repeating the sequential cycle of first, second and third stop positions. The order in which the stop positions after completion of the action of winding occur sequentially need not be limited to the cycle just mentioned. Optionally, the stop position of the winding roller 43 after completion of the action of winding may be varied randomly, for example.

The prescribed pulse numbers P may be set at desired values within the range between P1 as the minimum and P3 as the maximum and these prescribed pulse numbers may be randomly set selectively for the counter variable. In this modification, the winding roller 43 is allowed to make a stop at any desired position between the first stop position and the third stop position after completion of the action of winding, so that the distance of the stop position from the position for design basis can be varied for each of the stops to be made.

The cover winding device 40 adapted to prevent the magazine cover 32 from forming a wrinkle owing to the operation of the stop position varying means 60 has been described. Optionally, load imparting means 65 capable of exerting a load to the rotation of the winding roller 43 during the action of rewinding may be provided on the cover winding device 40 either to take the place of the stop position varying means 60 or cooperate with the stop position varying means 60 in preventing the cover 32 from forming a wrinkle.

An electromagnetic clutch 65 intended as load imparting means is connected to the supporting shaft 43a of the winding roller 43 as shown by an imaginary line in FIG. 5. This electromagnetic clutch 65 is adapted to be turned on when the winding roller 43 is rewound. When the electromagnetic clutch 65 is turned on, a friction plate (not shown) of the electromagnetic clutch 65 exerts upon the winding roller 43 rotating in the direction rW of rewinding a load or tension tending to stop this rotation. As a result, the winding roller 43 is prevented more easily from being rewound than when no load is exerted thereon. The electromagnetic clutch 65 is connected to such control means as a CPU (not shown). This CPU, when the magazine cover is rewound, emits to the electromagnetic clutch 65 a control signal to turn on the clutch 65.

The load imparting means need not be limited to the electromagnetic clutch 65 but may be freely configured to allow exertion of a load to the rotation of the winding roller 43 while the roller is in the process of the action of rewinding.

Now, the operation of the cover winding device 40 which is provided with the load imparting means 65 will be described below.

Figure 9:
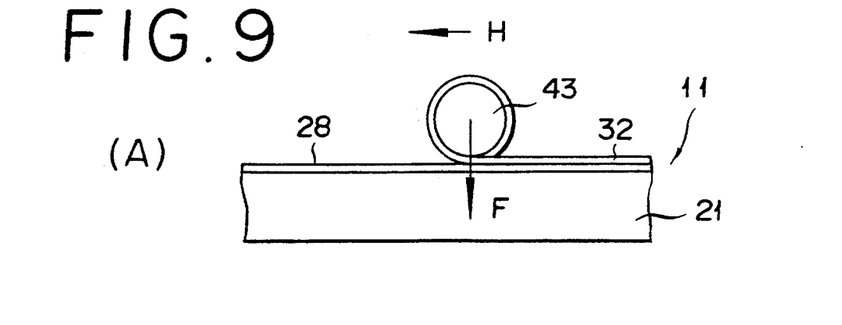

This operation is depicted in FIG. 9. FIG. 9 (A) represents the case in which no load is exerted on the rotation of the winding roller 43 during the action of rewinding and FIG. 9 (B) the case in which the load is exerted on the rotation of the winding roller 43 during the action of rewinding. In the diagrams, stands for the force with which the winding roller 43 presses the magazine cover 32.

When the action of rewinding the magazine cover 32 is started, the tension exerted on the magazine cover 32 suddenly decreases. At this time, the electromagnetic clutch 65 is turned on and caused to exert the load upon the rotation of the winding roller 43. As a result, the winding roller 43 ceases to rotate smoothly and a tensile force Ta directed to the front side of the magazine 11 consequently acts on the winding roller 43. By this tensile force Ta, the magazine cover 32 is drawn in the direction H of the front side of the magazine 11. It follows that the magazine cover 32 is stretched and simultaneously applied tautly to the edge 28 of the magazine.

In the cover winding device 40 which is provided with the load imparting means 65 as described above, owing to the exertion of the load upon the rotation of the winding roller 43 during the action of rewinding, the possibility that the part of the magazine cover 32 approximating the stop position assumed after completion of the action of winding will form a wrinkle when the cover 32 is rewound and applied again to the edge 28 of the opening part 27 is precluded even when the action of winding the cover 32 and the action of rewinding it are repeated. As a result, the lightproofness of the medium M held in the magazine 11 is maintained, the performance of the magazine 11 itself improved, and the frequency of use of the magazine 11 increased.

The embodiment described thus far represents the case in which the cover winding device 40 provided with the stop position varying means 60 and the load imparting means 65 is applied to a laser printer. The embodiment of the cover winding device 40 of this invention need not be limited to the application of such image forming devices as the printer. The container, for example, need not be limited to the magazine 11 which demands lightproofness as described above but may be a container which abhors absorption of moisture or a container which abhors leakage of water. The cover winding device contemplated by this invention can be effectively utilized for these containers.

Though the embodiment represents the case in which a cover member is wound by the winding roller 43 as a winding member, the construction of the winding member and the method of winding the cover member are irrelevant so long as the cover winding device is capable of thoroughly sealing the gap between the container and the cover member.

The cover winding apparatus contemplated by this invention enables the stop position assumed by the winding member after completing the action of winding to be varied each time the cover member is wound owing to the stop position varying means and/or the load is exerted upon the rotation of the winding member during the action of rewinding the cover member owing to the load imparting means as described above, the possibility of the cover forming a wrinkle is precluded even when the action of winding the cover member and the action of rewinding it are repeated. As a result, the cover member is enabled to close the opening part of the container and keep the container-tightly closed.

While this invention has been illustrated and described in accordance with a preferred embodiment, it is recognized that variations and changes may be made and equivalents employed herein without departing from the invention as set forth in the claims.

We claim:

1. A cover winding apparatus for winding a cover that is detachably attached to an opening part of a container, comprising:

a roller member movable along said opening part of said container and capable of winding, on the periphery thereof said cover, whereby said cover can be peeled off said opening part of said container;

drive means for rotationally driving said roller member in the direction of winding said cover thereon and moving said roller member along said opening part; and control means controlling said drive means so as to positively vary, for each action of winding, a stop position at which said roller member completes the work of winding said cover, whereby the stop position will never be at the same position as the previous stop position.

2. A cover winding apparatus according to claim 1, which further comprises detecting means for detecting said roller member, selectively, at a plurality of predetermined positions for stopping said roller member and outputting a detect signal to said control means.

3. A cover winding apparatus according to claim 2, wherein said detecting means comprises a plurality of detecting sensors which are disposed, one each, at said plurality of predetermined positions for stopping said roller member and said control means causes said rotational driving of said roller member by said drive means to be stopped on the basis of an output of a detecting sensor different from the detecting sensor which was used in the previous action of winding.

4. A cover winding apparatus according to claim 1, wherein said drive means is provided with a stepping motor and said control means is adapted to vary for each action of winding a pulse number to be supplied to the stepping motor.

5. A cover winding apparatus according to claim 1, which further comprises clock means for clocking different lengths of time and wherein said control means effects control for said clock means to clock a length of time different from a length of time clocked in a previous round winding cycle and, at the same time, causes the rotational driving of said roller member by said drive means to be stopped on completion of the clocking by said clock means.

6. A cover winding apparatus according to claim 5, which further comprises detecting sensors disposed at prescribed positions and adapted to emit to said clock means a signal to start clocking on detection of said roller member.

7. A cover winding apparatus according to claim 1, which further comprises supporting means provided with a supporting part for supporting said roller member in such a manner to be rotated and, at the same time, moved along said opening part of said container.

8. A cover winding apparatus according to claim 7, which further comprises second drive means for moving said supporting part in a prescribed direction and consequently enabling the motion of said supporting part in said prescribed direction to rewind the cover wound on said roller member.

9. A cover winding apparatus according to claim 8, which further comprises tension imparting means capable of imparting tension to said cover being rewound from said roller member while said supporting part is being moved by said second drive means.

10. A cover opening and closing apparatus for opening and closing a cover that is detachably attached to an opening part of a container, comprising:

a roller member capable of winding on the periphery thereof said cover, whereby said cover is peeled off the opening part of said container;

support means for supporting said roller member in such a manner as to be rotated and, at the same time, moved along said opening part of said container;

first drive means for rotationally driving said roller member in the direction of winding said cover thereon and moving said roller member along said opening part of said roller member;

second drive means for moving said roller member in the direction of closing said opening part of said container and rewinding said cover wound on said roller member;

load imparting means for exerting a force to said cover upon the rotation of said roller member while said roller member is being moved by said second drive means.

11. A cover opening and closing apparatus according to claim 10, wherein said load imparting means is provided with a friction member connected to said roller member.

12. A cover opening and closing apparatus according to claim 11, wherein said load imparting means is provided with a clutch disposed between said roller member and said friction member and adapted to switch the transmission of force and said clutch is adapted to effect transmission of force while said cover is being rewound by said second drive means.

13. A cover opening and closing apparatus according to claim 10, which further comprises drive switch means capable of breaking transmission of the drive of said second drive means when said first drive means is set for driving and breaking transmission of the drive of said first drive means when said second drive means is set for driving.

14. A cover opening and closing apparatus according to claim 10, wherein said second drive means directly drives said support means to move said roller member.

15. A cover winding apparatus for a container having an opening which can be sealed with a flexible thin cover comprising:

means for attaching to the cover;

means for repetitively removing the cover, by the attaching means, from the container to expose the opening and to store the cover at a position for reattachment to the container; and means for positively varying the position of the cover when removed and stored between each occasion of removal so that the stop position will never be at the same position as a previous stop position, whereby wrinkles are inhibited from being formed in the cover over the expected life of the container.

16. A cover winding apparatus as in claim 14 wherein the means for varying includes a plurality of detector sensors positioned relative to potential stop positions of the cover.

17. A cover winding apparatus as in claim 16 wherein the means for removing includes a roller that can wind up and unwind the cover across the opening.

18. A cover winding apparatus as in claim 17 wherein the cover and container further include adhesive means for repetitively adhering the cover to the container.

19. A cover winding apparatus as in claim 14 wherein the means for varying includes a timer means for providing different time periods corresponding to different positions to control the removing means.

20. A cover winding apparatus as in claim 19 wherein the means for removing includes a roller that can wind up and unwind the cover across the opening.

21. A cover winding apparatus as in claim 20 wherein the cover and container further include adhesive means for repetitively adhering the cover to the container.

22. A cover winding apparatus for a container having an opening which can be sealed with a flexible thin cover comprising:

a roller member movable along said opening of said container and capable of winding on the periphery of said cover;

drive means for rotationally driving said roller member in the direction of winding said cover thereon and moving said roller member along said opening;

set means for setting a plurality of stop positions of said roller member along said opening;

select means for selecting one position from a plurality of stop positions set by set means in turn; and control means for controlling said drive means to move said roller member and to stop said roller member at the position selected by said select means.

23. A cover winding apparatus according to claim 22, wherein said set means includes a plurality of sensors which correspond to said plurality of stop positions and said control means stop said roller member on the basis of an output of the sensor corresponding to the position selected by said select means.

24. A cover winding apparatus according to claim 22, wherein said drive means is provided with a stepping motor and said set means is adapted to vary for each action of winding a pulse number to be supplied to the stepping motor.

25. A cover winding apparatus according to claim 22, wherein said set means includes clock means for clocking a plurality of lengths of time corresponding to said plurality of stop positions and wherein said control means effects control for said clock means to clock a length of time selected by said select means and, at the same time, causes the rotational driving of said roller member by said drive means to be stopped on completion of the clocking by said clock means.

26. A cover winding apparatus according to claim 25, which further comprises detection sensors disposed at prescribed positions and adapted to emit, to said clock means, a signal to start clocking on detection of said roller member.

27. A cover winding apparatus according to claim 22, which further comprises supporting means provided with a supporting part for supporting said roller member in such a manner to be rotated and, at the same time, moved along said opening of said container.

28. A cover winding apparatus according to claim 27, which further comprises second drive means for moving said supporting part in a prescribed direction and consequently enabling the motion of said supporting part in said prescribed direction to rewind the cover wound on said roller member.

29. A cover winding apparatus according to claim 28, which further comprises tension imparting means capable of imparting tension to said cover being rewound from said roller member while said supporting part is being moved by said second drive means.

* * * * *